United States Patent [19]

Ritchie et al.

[11] Patent Number: 4,690,789
[45] Date of Patent: Sep. 1, 1987

[54] REFRIGERANT COOLED PLASTIC MOLDING, METHOD AND APPARATUS

[75] Inventors: Robert C. Ritchie, Braintree, Mass.; Henry J. McKone, Francestown, N.H.; Richard H. Stamm, Mt. Prospect, Ill.

[73] Assignees: Dart Industries Inc., Northbrook, Ill.; Energy Systems Industries, Inc., Newton, Mass.

[21] Appl. No.: 711,546

[22] Filed: Mar. 13, 1985

[51] Int. Cl.⁴ ..................... B29C 35/04; B29C 45/72; B29C 45/76
[52] U.S. Cl. ..................... 264/40.1; 62/218; 62/220; 62/292; 62/504; 62/DIG. 21; 264/328.14; 425/144; 425/169; 425/407; 425/458
[58] Field of Search ............... 425/135, 143, 144, 547, 425/407, 169, 548; 62/115, 310, 503, 504, 524, 525, 218, 220, DIG. 21, 77, 292, 270, 222; 264/40.1, 40.6, 328.14

[56] References Cited

U.S. PATENT DOCUMENTS

| 3,127,753 | 4/1964 | Tinnerman | 425/547 X |
| 3,303,663 | 2/1967 | Miller et al. | 62/292 |
| 3,352,124 | 11/1967 | Watkins | 62/504 |
| 3,353,367 | 11/1967 | Garland et al. | 62/218 |
| 3,400,552 | 9/1968 | Johnson et al. | 62/292 |
| 3,583,467 | 6/1971 | Bennett et al. | 425/144 X |
| 3,753,356 | 8/1975 | Kramer | 62/292 |
| 4,123,919 | 11/1978 | Fehlhaber | 62/503 |
| 4,508,670 | 4/1985 | Janke | 425/144 X |
| 4,545,210 | 10/1985 | Lord | 62/77 |

Primary Examiner—Willard E. Hoag
Attorney, Agent, or Firm—Lee, Smith & Zickert

[57] ABSTRACT

Method and Apparatus for cooling a mold having plural parallel cooling passages therethrough, the mold having flow control means at the inlet and sight glasses at the outlets and being arranged for overfeed so that liquid is always present in all cooling passages to avoid hot spots in the mold.

26 Claims, 4 Drawing Figures

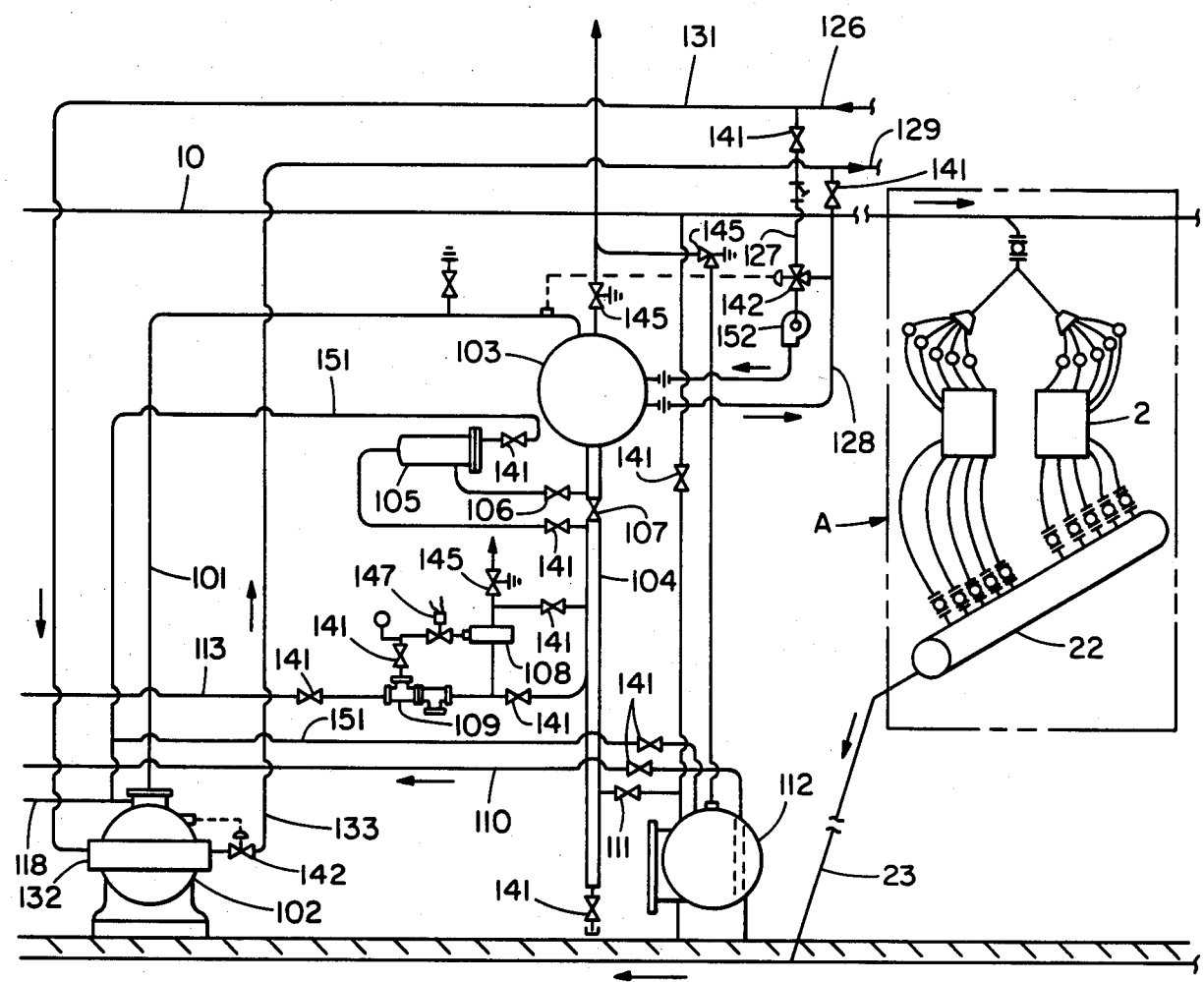
FIG.IB

REFRIGERANT COOLED PLASTIC MOLDING, METHOD AND APPARATUS

BACKGROUND OF THE INVENTION

1. Field of the Invention

This invention relates to cooling of plastic molding machines, and more particularly to an apparatus and method for liquid overfeed refrigerant cooling of the molds of molding machines for the manufacture of plastic articles.

2. The Prior Art

It is known that to improve the efficiency, throughput, and product quality of plastic molding machines, it is desirable to provide a means for cooling the mold. Such mold cooling brings about a more rapid solidification of the hot liquid plastic, shortening the time that must be waited before the freshly molded article develops sufficient strength to be removed from the mold. Furthermore, coolant flow passages in the mold may be selectively arranged to cause evenly distributed cooling according to the shape of the molded article to achieve a product of uniform physical properties. Consquently, the development of methods and apparatus for achieving effective and efficient mold cooling has been a concern of those skilled in the plastic molding art.

As a basis for attempting to achieve improved plastic mold cooling, it is important to understand the factors involved in mold heat transfer. These factors include the thermal conductivity of the plastic itself, the specific heat of the plastic itself, the heat transfer characteristics of the boundary layer between the plastic and the inner surface of the mold, the thermal conductivity of the mold material, the variable linear distance between the inner surface of the mold and the coolant flow passage, the total mass of the mold, the heat transfer characteristic of the boundary layer between the surface of the cooling channel and the cooling medium, the temperature of the cooling medium, the velocity of the cooling medium, the temperature of the hot plastic, and the radiation effect of the mold to objects within the space.

Conventional mold cooling systems presently in use employ water as the coolant medium, a liquid having relatively high boiling and freezing points. The temperature of the coolant is lowered by passing it through refrigerated coils, a process which is low in energy efficiency. To increase the rate of mold cooling, much emphasis has been placed in the past on the importance of temperature and velocity of the cooling medium. As a result, the coolant temperature has been lowered, and the coolant flow rate has been increased, or both. Lowering the coolant temperature results in a greater temperature difference between the coolant and the inner surface of the mold coolant passages. Increasing the coolant velocity tends to increase the rate at which heat is carried away from the mold.

In a typical water-cooled injection molding situation, the hot plastic will be injected at a temperature of about 480° F. Water coolant is typically at 50° F. According to the basic heat transfer equation, the rate of heat transfer is equal to the overall coefficient of heat transfer times the product of temperature difference and the area of the cooling interface. By lowering the water temperature from 50° F. to 40° F., thus increasing temperature difference from 430° F. to 440° F., the rate of overall heat transfer is increased by only about two percent. This small gain is more than offset by the added cost of further cooling the water and the possible need to dehumidify the room.

Of course, the water temperature should not be below the freezing point. When water is cooled from 42° to 40° F. in a typical heat exchanger with refrigerant, the refrigerant must be at about 30° F. Therefore, to prevent icing, an antifreeze such as glycol must be added to the water. However, this changes the specific heat, viscosity and conductivity of the heat transfer fluid thereby reducing overall mold cooling efficiency.

The approach of increasing the water coolant flow rate is effective in reducing overall costs only up to an optimum point, after which, exponentially increasing costs of pumping more than offset the savings from the increased heat transfer rate.

One of the impediments to rapid and efficient heat transfer is the existence of a resistance to heat transfer known as the film coefficient. This is a laminar film of resistance to heat flow that exists on both sides of the heat transfer surface. Lower coolant temperature has a negligible effect on the film and increased fluid flow rates would incur serious operating cost penalties.

U.S. Pat. No. 3,127,753 discloses a system in which a suitable refrigerant, such as Freon 12 (dichlorodifluoromethane) (Freon is a trademark of E. I. DuPont de Nemours & Co.), is delivered in liquid state to a single expansion valve. When passing through the expansion valve, some of the liquid refrigerant changes to vapor. A mixture of liquid and vapor enters each mold die element through single feed lines. In the mold die elements, the refrigerant is changed to superheated vapor which then exits to a conventional compressor, condenser, and receiver arrangement for recirculation. A superheat control is provided to modulate the single expansion valve and ensure that all refrigerant exiting the mold dies is superheated. The patent also discloses a means for controlling the degree of mold cooling comprising thermocouples in the mold die elements associated with modulating valves in the single mold die feed lines.

Thus, U.S. Pat. No. 3,127,753 addresses itself to increasing system efficiency by eliminating a separate heat exchanger and by lowering the coolant temperature. The apparatus disclosed therein is intended to make the mold as cold as possible. This means that the room must be dehumidified and capital equipment must be added to obtain the lower temperatures. Coolant compression costs are much greater for colder vapor since larger compression equipment is needed to remove a given amount of heat at a lower refrigerant temperature.

SUMMARY OF THE INVENTION

The present invention solves the problems of efficient mold cooling of the prior art by providing a method and apparatus for liquid overfeed refrigeration cooling of plastic molds. Liquid overfeed is a method of refrigeration wherein refrigerant is forced through an evaporator such that refrigerant exiting the evaporator is partially in the liquid state. The invention further provides for separate independently and selectively adjustable flows of boiling refrigerant through each mold cooling fluid passageway. The term "mold" as used herein is intended to include any device for imparting form to heated plastic material, such as, but not limited to, the male and female parts of an injection mold or the die of an extruder.

According to the invention, liquid refrigerant enters the mold's cooling passages via liquid refrigerant distributor tubes emanating from a liquid distributor. The quantity of liquid refrigerant is precisely controlled to each individual mold passage or circuit by fixed or manually or automatically adjustable metering devices such as distributors, valves, capillaries, or orifices, to satisfy the unique and distinctive characteristics of each mold passageway. As the liquid enters the mold it absorbs heat from the product being molded. The absorbtion of heat results in a violent boiling of the refrigerant liquid which is controlled throughout the entire length of the mold passage. This boiling action disrupts and tends to destroy the laminar film on the heat transfer surface. This boiling action greatly increases the heat transfer coefficient and thereby substantially reduces the required cooling cycle when contrasted with conventional chilled water cooling cycles and refrigerant cycles employing superheat. The approximate mixture of gas to liquid refrigerant is one part gas to three parts liquid as the refrigerant stream exits the mold.

The gas/liquid mixture leaves the mold and returns via a return line to the low pressure accumulator. The primary function of the latter is to separate the mixture into two distinct components, gaseous and liquid. The gaseous component is evacuated via the compressor itself wherein it is compressed to a high pressure, high temperature gas. Leaving the compressor the gas is routed to a refrigerant condenser which converts the refrigerant back to liquid state. The liquid refrigerant then passes through a throttling device from whence it is returned to the low pressure accumulator. A liquid recirculating pump draws the low pressure refrigerant from the accumulator and discharges it into the refrigerant line to the plastic molding machine. The pumped liquid is elevated in pressure. At the plastic molding machines, the liquid refrigerant is reintroduced to the mold passages as described above for a continuous process.

An oil receiver/still complete with oil piping and transfer pump is installed on the low-pressure accumulator to return the lost compressor oil back to the refrigeration compressor. Refrigeration compressor lubricating oil is cooled by process cooling water.

In a preferred embodiment of the apparatus of the invention, a first sight glass is provided in the supply line at the mold site. A metering device is provided in each of the feed lines. A second sight glass is provided in each of the effluent lines.

In operation, the metering devices are manually or automatically adjusted while observing the refrigerant in the sight glasses. The metering devices are independently and selectively adjusted to obtain an all-liquid refrigerant supply in the first sight glass and an optimum liquid/vapor refrigerant mixture in the second sight glasses. By attaining this mixture, it is ensured that the refrigerant temperature throughout each of the mold cooling passageways is no greater than the boiling point and that the refrigerant throughout each of the mold cooling passageways is in a turbulent, boiling state.

The two results of low-temperature and boiling action made possible by the invention bring about the heretofore unobtained advantages in refrigerant cooled plastic molding of preventing the refrigerant from reaching a superheated vapor state, thus avoiding a reduction in temperature difference, and of breaking down the film coefficient in the mold cooling passageways. Thus, mold cooling rates are significantly increased without unproductive and ineffective resort to unnecessarily low coolant temperatures and unduly high coolant flow rates. The invention takes advantage of the superior heat transfer properties of a boiling refrigerant mixture over a superheated refrigerant vapor.

Since each mold cooling passageway is likely to present a different resistance to refrigerant flow, the provision of the invention for individual, independently and selectively meteredrefrigerant flows to each cooling passageway allows for optimal, uniform mold cooling. Furthermore, the invention is suitable for use with molds having but a single cooling passageway, in which case a single feed flow would be provided through the passageway. Alternatively, when the mold cooling passageways are sufficiently similar in flow characteristics, the invention may be configured with a single metering device for controlling the flow through all of the mold cooling passageways.

An additional advantage of the invention is that the fluorocarbon refrigerant acts as a cleaning agent to maintain the cooling passageways free of contaminants and obstructions.

The superior performance and efficiency of applicants' invention has been determined on an experimental installation. Twenty-nine molds for products of varying size and shape were tested. On forty-eight percent of the items tested, a thirty-five percent cycle time reduction as compared to chilled water was attained. This equates to a fifty-four percent productivity gain. On eighty-six percent of the items tested, a twenty-seven percent cycle time reduction was attained, equating to thirty-seven percent productivity gain. On the entire population tested, the average cycle time reduction was twenty-five percent, which is a thirty-three percent productivity gain. This increase in productivity was accomplished with both improved product quality, fewer produced rejects, and reduced energy input per unit of production.

BRIEF DESCRIPTION OF THE DRAWINGS

FIGS. 1A and 1B taken together are a diagrammatic illustration of apparatus embodying the principles of the invention as used in a plastic molding process;

DESCRIPTION OF A PREFERRED EMBODIMENT

Figure 1A:
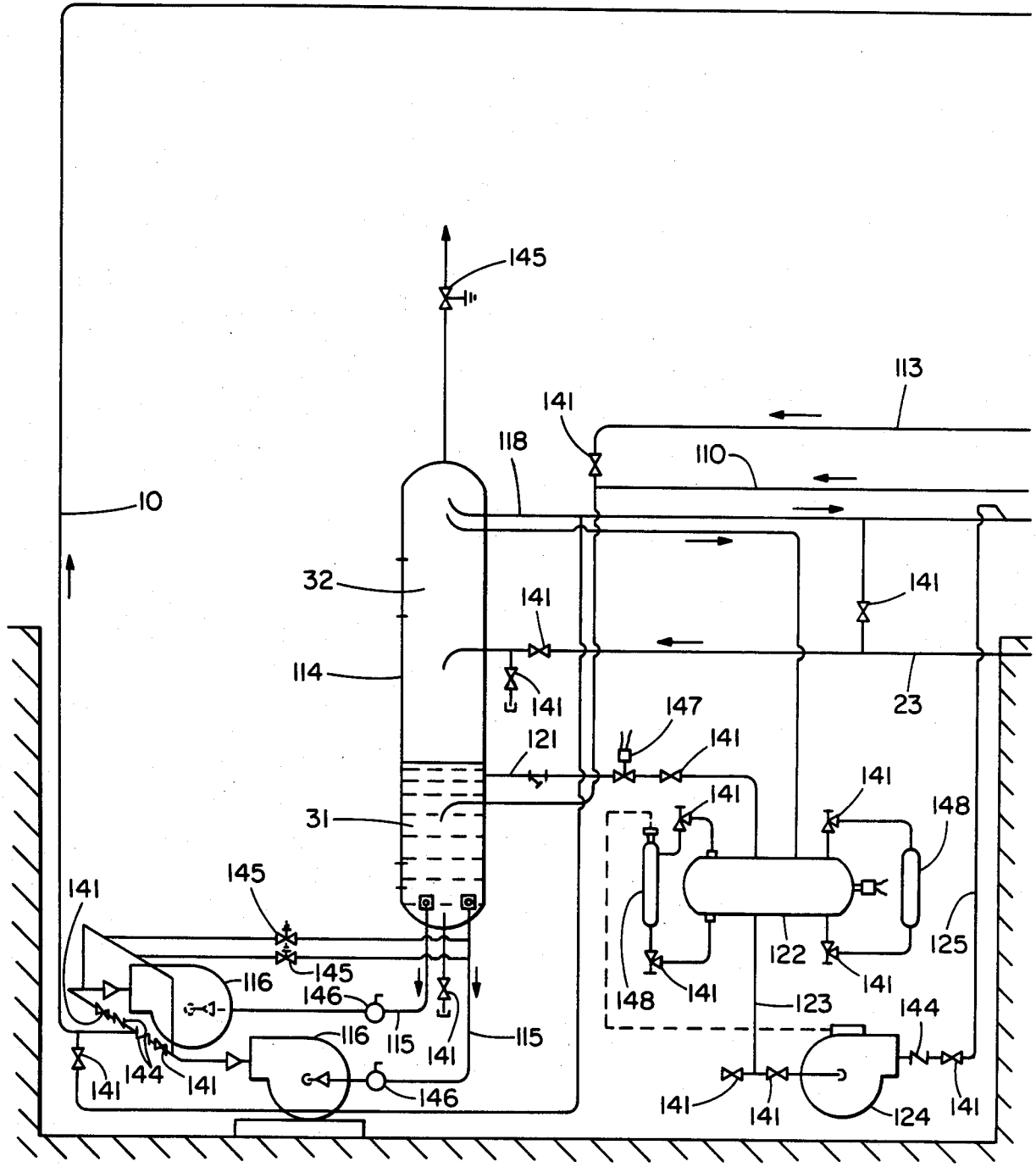

By way of disclosing a preferred embodiment of the invention, and not by way of limitation, FIGS. 1A and 1B taken together diagrammatically show the apparatus of the invention configured to cool the mold of a plastic injection molding machine A having first mold element 1 and second mold element 2. It should be understood that the molding machine A will usually be at a distance from the liquid recirculating system of the apparatus which may be suitably housed in an equipment room, and that the apparatus may be used to cool a plurality of molding machines.

In the liquid recirculating system of the invention, refrigerant hot gas line 101 runs from compressor 102 to water cooled condenser receiver 103. High-side liquid line 104 runs from condenser receiver 103 thru filter drier 105, or bypasses filter drier 105 if inlet valve 106 is closed to drier 105 and bypass valve 107 is open, to pilot float valve 108 and pilot operated valve 109. High-side liquid line 104 also runs through normally closed shut-off valve 111 to liquid receiver 112 for refrigerant storage. Stored liquid phase refrigerant is then passed from receiver 112 through line 110 to the lower region of the low pressure accumulator 114.

Low-side liquid line 113 runs from pilot operated valve 109 to low pressure accumulator 114. Pump suction low-side liquid line 115 runs from accumulator 114 to liquid refrigerant pumps 116, one of which is a standby. Pump discharge low-side liquid line 10 runs from pump 116 to the cooling load, the mold of injection molding machine A. Refrigerant two phase mixture return line 23 runs from the suction manifold 22 to the accumulator 114. Refrigerant vapor compressor suction line 118 runs from the accumulator 114 to the screw compressor 102. First compressor oil return line 121 runs from accumulator 114 to heated oil receiver 122. Second oil return line 123 runs from receiver 122 to oil pump 124. Third oil return line 125 runs from oil pump 124 to compressor suction line 118.

Condenser receiver cooling water supply piping 126,127 runs from a plant cooling water supply through pump 152 to condenser receiver 103 to the cooling water return piping 128,129. Oil cooling water supply piping 131 runs from a plant cooling water supply to compressor oil cooler 132 and then from the compressor oil cooler to the cooling water return piping 133.

Throughout the apparatus there are provided shut-off valves 141, control valves 142, check valves 144, relief valves 145, ball valves 146, solenoid valves 147, level indicators 148, and bleed-off lines 151 for purposes of control, venting, and maintenance.

In the accumulator 114, liquid phase refrigerant 31 falls to the bottom, while vapor phase refrigerant 32 rises to the top. Vapor phase refrigerant is taken from the upper region of the accumulator 114 through line 118 to compressor 102. Compressed refrigerant exits the compressor through line 101 to condenser 103 where heat is removed from the refrigerant and the refrigerant is converted to liquid phase and returned through line 104 to pilot operated valve 109 and line 113 to accumulator 114.

Liquid phase refrigerant is drawn from the lower region of the accumulator 114 by one of the pumps 116. The pump delivers a flow of refrigerant to supply line 10 and thereafter to the plastic mold site.

The purpose of the liquid recirculating system as described thus far is to deliver a supply of all liquid phase refrigerant to molding machine A through liquid line 10, to return liquid/vapor phase refrigerant from the molding machine A through return line 23, and to compress, remove heat, and condense vapor phase refrigerant to liquid, then to be recycled to the molding machine as liquid refrigerant. The sizes and capacities of the components of the apparatus should be chosen according to the cooling requirements of the molding machine or machines A.

Figure 2:
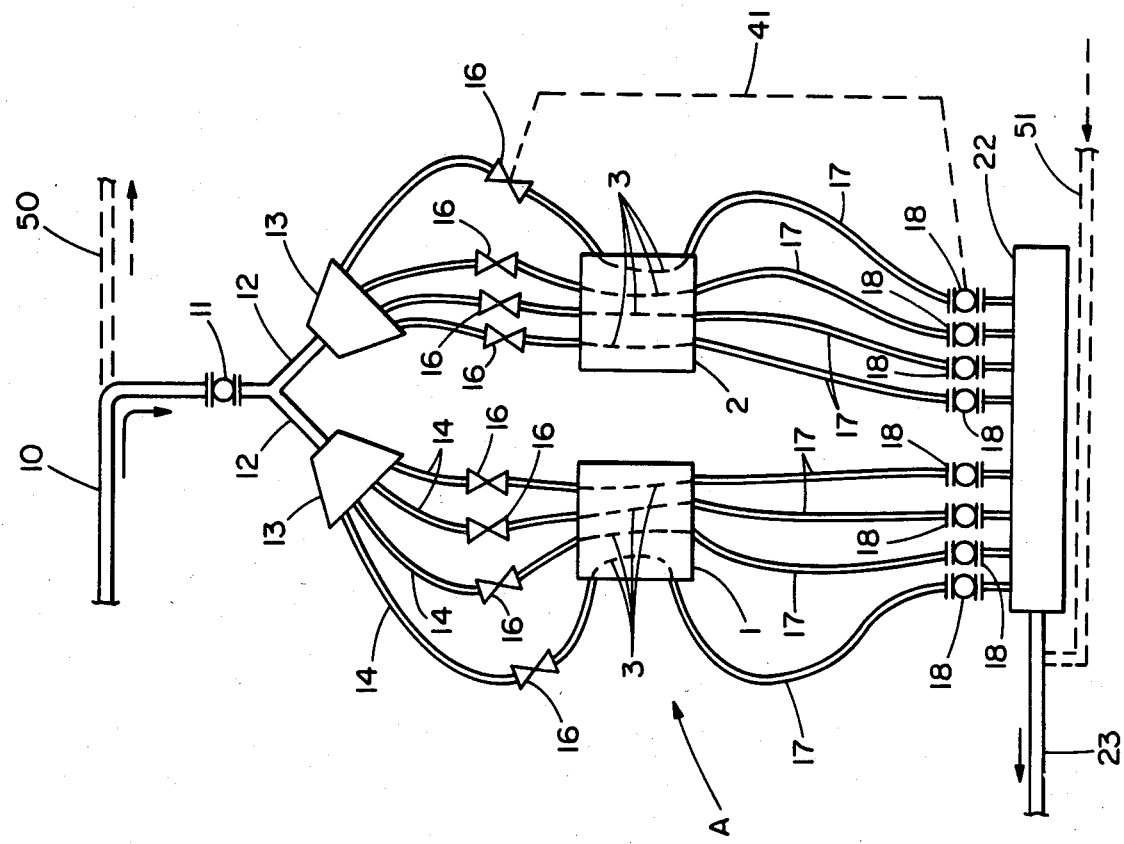
FIG. 2 is an enlarged diagrammatic illustration of the plastic molding machine shown in FIG. 1B.

Referring now to FIG. 2, at the plastic mold machine site there is provided a supply of liquid phase refrigerant through supply line 10. It is contemplated in the preferred embodiment of the invention that the refrigerant is a fluorocarbon such as Freon R-12. The refrigerant passes from the supply line 10 through a first sight glass 11. From the sight glass 11, the refrigerant flow is divided into a number of feeder lines 12 corresponding to the number of mold parts, which in this illustration is two. Each feeder line leads to a distributor 13.

The distributors 13 further divide the refrigerant flows into a plurality of individual flows corresponding to the number of cooling passageways 3 in the mold parts 1 and 2. These individual flows are conducted through distributor tubes or feed lines 14. In each feed line 14, there is disposed a metering device, which, in this embodiment, is a manual needle valve 16. Downstream of the needle valves 16, the feed lines communicate directly and individually with the mold cooling passageways 3.

The individual refrigerant flows each exit the cooling passageways to a plurality of effluent lines 17. In each of the effluent lines, there is disposed a second sight glass 18. The sight glasses 18 should be placed as near as practicable to the mold so that the refrigerant state observable through the sight glasses 18 is accurately representative of the refrigerant state in the cooling passageways 3.

At the injection mold site, an operator will adjust the individual refrigerant flows to the cooling passageways 3 to obtain a liquid and vapor phase refrigerant mixture throughout the cooling passageways. This is achieved by carefully adjusting each of the needle valves 16 so that the flow observable through sight glass 11 is all liquid phase and the flow observable in each of the sight glasses 18 are a boiling liquid and vapor mixture, preferably one part vapor to three parts liquid.

As shown by phantom lines 50 and 51, it is possible to extend supply line 10 and return line 23 to connect additional plasticmolding machines to the system in parallel fashion.

The embodiment of the invention shown in the drawings uses a gravity return of liquid/vapor refrigerant from the mold machines to the recirculating system. Thus, return line is situated below the mold parts and slopes downwardly toward the accumlator 114. The accumlator and pumps 116 are placed in a pit. However, it is within the scope of this invention to provide other means of return feed such as by lifting liquid/vapor refrigerant to overhead return lines.

Figure 3:
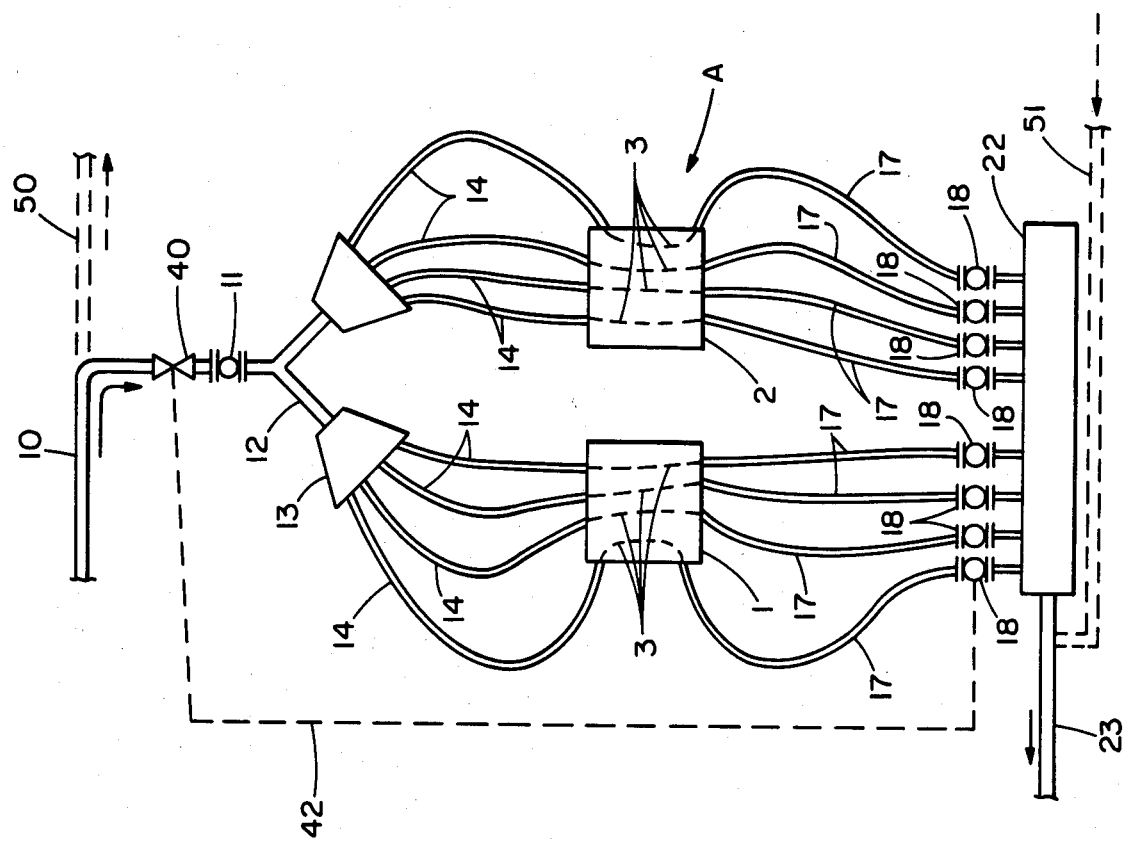
FIG. 3 is similar to FIG. 2 but shows an alternative embodiment of the apparatus of the invention.

It is possible with some molds that individual control of refrigerant flow through each cooling passageway 3 is not necessary. The passageways 3 may be similar in length, diameter, exposure to heat, and other characteristics such that a single control over all feed lines is sufficient. Thus, in FIG. 3 there is shown an alternative embodiment of the invention where the plurality of needle valves 16 is replaced by a single needle valve 40 located upstream of the distributors 13 and in fluid communication with the feed lines. The operator adjusts valve 40 to obtain a liquid/vapor mixture in sight glasses 18.

Also, a fixed metering device such as an orifice or capillary selected for the characteristics of a particular mold may be employed instead of the valves 16 or 40.

It is further within the scope of the invention to provide automatic control of the metering devices. In FIG. 2 there is shown a feedback control 41 which comprises a means for automatically detecting the quality of the refrigerant downsteam of the mold and automatic means associated with valves 16 responsive to the refrigerant quality to adjust the valves 16 so that there is attained a prescribed optimum quality of the refrigerant. By "quality" is meant characteristics such as densities, temperature, or optical properties from which the liquid/vapor ratio may be derived. Similarly, in FIG. 3, feedback control 42 is shown.

While the invention has been disclosed with reference to injection molding and specific embodiments, it should be understood that use of the invention with other molding processes or other modifications and configurations is within the scope of the contribution to the art and the patent warranted hereon.

We claim:

1. A method for molding hardenable material in a mold a molding machine subject to repeated and rapid variations in mold cooling requirements, the mold being of the type having one or more cooling fluid passageways formed therethrough, said method comprising the steps of:
    providing a supply flow of liquid phase refrigerant to the site of the molding machine;
    distributing the supply flow into feed flows through the cooling fluid passageways;
    independently adjusting each of the feed flows to obtain a mixed phase flow consisting of a boiling liquid phase and vapor phase refrigerant mixture throughout each of the cooling fluid passageways; and
    monitoring each feed flow exiting each passageway such that a majority of such flow by weight is in a liquid phase.

2. The method of claim 1 wherein said step of adjusting includes adjusting metering means disposed in fluid communication with said feed flows.

3. A method for cooling the mold of a molding machine having repeated and rapid variation in mold cooling requirements, the mold being of a type having a plurality of cooling fluid passageways formed therethrough, comprising the steps of:
    providing a supply flow of liquid phase refrigerant at the site of the molding machine;
    distributing the refrigerant supply flow into a plurality of feed flows equal in number to the number of cooling fluid passageways;
    passing each of the individual feed flows through one of the cooling fluid passageways;
    providing metering means disposed in fluid communication with each feed flow for individual adjustment of refrigerant flow of each feed flow;
    adjusting the metering means to obtain a mixed phase flow consisting of a boiling liquid phase and vapor phase refrigerant mixture throughout each of the cooling fluid passageways; and
    monitoring each feed flow exiting its associated passageway such that a majority of such flow by weight is in a liquid phase.

4. The method of claim 3 wherein said step of providing metering means comprises providing a plurality of individually adjustable metering means each in fluid communiction with an individual feed flow, and said step of adjusting comprises selectively and independently adjusting each of said individually adjustable metering means.

5. The method of claim 1 wherein the step of gauging includes the steps of:
    providing sight glasses in fluid communication with each of said feed flows downstream of the mold and
    observing the refrigerant through said sight glasses.

6. The method of claim 3 further comprising the steps of:
    condensing the vapor phase refrigerant by compression and removal of heat,
    recycling the condensed refrigerant to said supply flow.

7. The method of claim 3 further comprising the step of removing said refrigerant mixture from the molding machine by gravity feed refrigerant return.

8. The method of claim 3 further comprising the step of removing said refrigerant mixture from the molding machine by overhead lift refrigerant return.

9. The method of claim 3 wherein said step of adjusting is performed manually.

10. The method of claim 5 wherein said step of adjusting is performed automatically.

11. In a method of refrigerant cooling of the mold of a molding machine having repeated and rapid variations in mold cooling requirements, the improvement comprising providing liquid overfeed of refrigerant to the mold through a plurality of mold cooling fluid passageways formed through the mold material, utilizing the mold as an evaporator such that a mixed phase flow occurs consisting of a liquid phase and a vapor phase with a majority of the refrigerant by weight remaining in a liquid state throughout each of the cooling fluid passageways and independently adjusting the flow of the refrigerant on each passageway and gauging the flow exiting each passageway to obtain the mixed phase flow.

12. A molding machine for molding hardenable materials, having a mold subject to repeated and rapid variations in cooling requirements, the mold having one or more cooling fluid passageways formed therethrough said apparatus comprising:
    means for providing a supply flow of liquid phase refrigerant at the site of the plastic molding machine;
    means for dividing the refrigerant supply flow into a number of individual feed flows corresponding in number to the number of cooling fluid passageways;
    means for separately conducting each of the feed flows through one of the cooling fluid passageways;
    means for independent adjustment of each of the feed flows to obtain a mixed phase flow consisting of a liquid phase and vapor phase refrigerant mixture throughout each of the cooling fluid passageway; and
    means for monitoring each feed flow exiting its associated passageway such that a majority of the flow by weight in in a liquid phase.

13. The apparatus of claim 12 wherein said means for adjustment comprises a metering means.

14. The apparatus of claim 13 wherein said metering means is adjustable.

15. The apparatus of claim 13 wherein said means is fixed.

16. The apparatus of claim 13 wherein said metering means comprises a valve.

17. The apparatus of claim 13 wherein said metering means comprises at least one distributor.

18. The apparatus of claim 13 wherein said metering means comprises at least one orifice.

19. The apparatus of claim 13 wherein said metering means comprises at least one capillary.

20. The apparatus of claim 12 wherein said means for adjustment comprises a plurality of metering devices, each one of said devices disposed in fluid communication with each of said feed flows.

21. The apparatus of claim 12 wherein said monitoring means comprises a sight glass in fluid communication with each of said feed flows and disposed downstream of said mold.

22. The apparatus of claim 12 further comprising automatic control means operatively associated with said means for adjustment.

23. The apparatus of claim 22 wherein said automatic control means comprises means for sensing the quality of at least one of said feed flows downstream of said mold and means responsive to the means for sensing for activating said means for adjustment.

24. The apparatus of claim 12 further comprising:
means for converting said vapor phase refrigerant to liquid phase; and
means for recycling the converted refrigerant to the plastic molding machine.

25. The apparatus of claim 12 further comprising means for conducting said refrigerant mixture away from the molding machine by gravity feed refrigerant return.

26. The apparatus of claim 12 further comprising means for conducting said mixture away from the molding machine by overhead lift feed refrigerant return.

* * * * *